US006854323B2

(12) United States Patent
Wiltsch

(10) Patent No.: US 6,854,323 B2
(45) Date of Patent: Feb. 15, 2005

(54) METHOD FOR DIAGNOSIS OF TANK LEAKAGE

(75) Inventor: Peter Wiltsch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/612,796

(22) Filed: Jul. 2, 2003

(65) Prior Publication Data

US 2004/0099052 A1 May 27, 2004

(30) Foreign Application Priority Data

Nov. 26, 2002 (DE) ........................................ 102 54 986

(51) Int. Cl.[7] .............................................. G01M 19/00
(52) U.S. Cl. ...................................................... 73/118.1
(58) Field of Search ............................ 73/118.1, 117.2, 73/302, 40.5 R; 123/520, 516, 518, 698, 90.12; 701/29; 137/202, 43; 141/65

(56) References Cited

U.S. PATENT DOCUMENTS 4,711,127 A * 12/1987 Hafner ........................ 73/302
5,078,006 A * 1/1992 Maresca et al. ......... 73/40.5 R
5,881,700 A * 3/1999 Gras et al. .................. 123/520
6,041,648 A * 3/2000 Angermaier et al. ....... 73/118.1
6,328,022 B1 * 12/2001 Kolb .......................... 123/520

FOREIGN PATENT DOCUMENTS

DE 198 30 234 A1 1/2000
DE 101 26 521 A1 12/2002

* cited by examiner

*Primary Examiner*—Edward Lefkowitz
*Assistant Examiner*—Octavia Davis
(74) *Attorney, Agent, or Firm*—Michael J. Striker

(57) ABSTRACT

In a prior art method proposed for determining the outgassing of fuel, the outgassing at the ambient pressure is determined, and it is not taken into consideration that with the tank leakage diagnosis, a negative pressure exists in the fuel tank. Since with negative pressure, more fuel gases out than with ambient pressure, too small of an outgassing is determined. With the tank leakage diagnosis, the fuel tank is evacuated at a diagnostic pressure and subsequently, a pressure increase is measured. From the trend of the pressure increase over the time, a leak is closed. Since the outgassing also affects a pressure increase, the measured total pressure increase must be corrected to the outgassing pressure increase. Since with the proposed method, the outgassing pressure increase is determined to be too small, frequently false reports can occur. The method of the present invention proposes to determine the outgassing at the same pressure that prevails with the tank leakage diagnosis in the fuel tank (1). A check valve (10) is regulated in a ventilation line, such that, in this manner a predetermined pressure corresponding to the diagnostic pressure in the fuel tank (1) is adjusted.

10 Claims, 1 Drawing Sheet

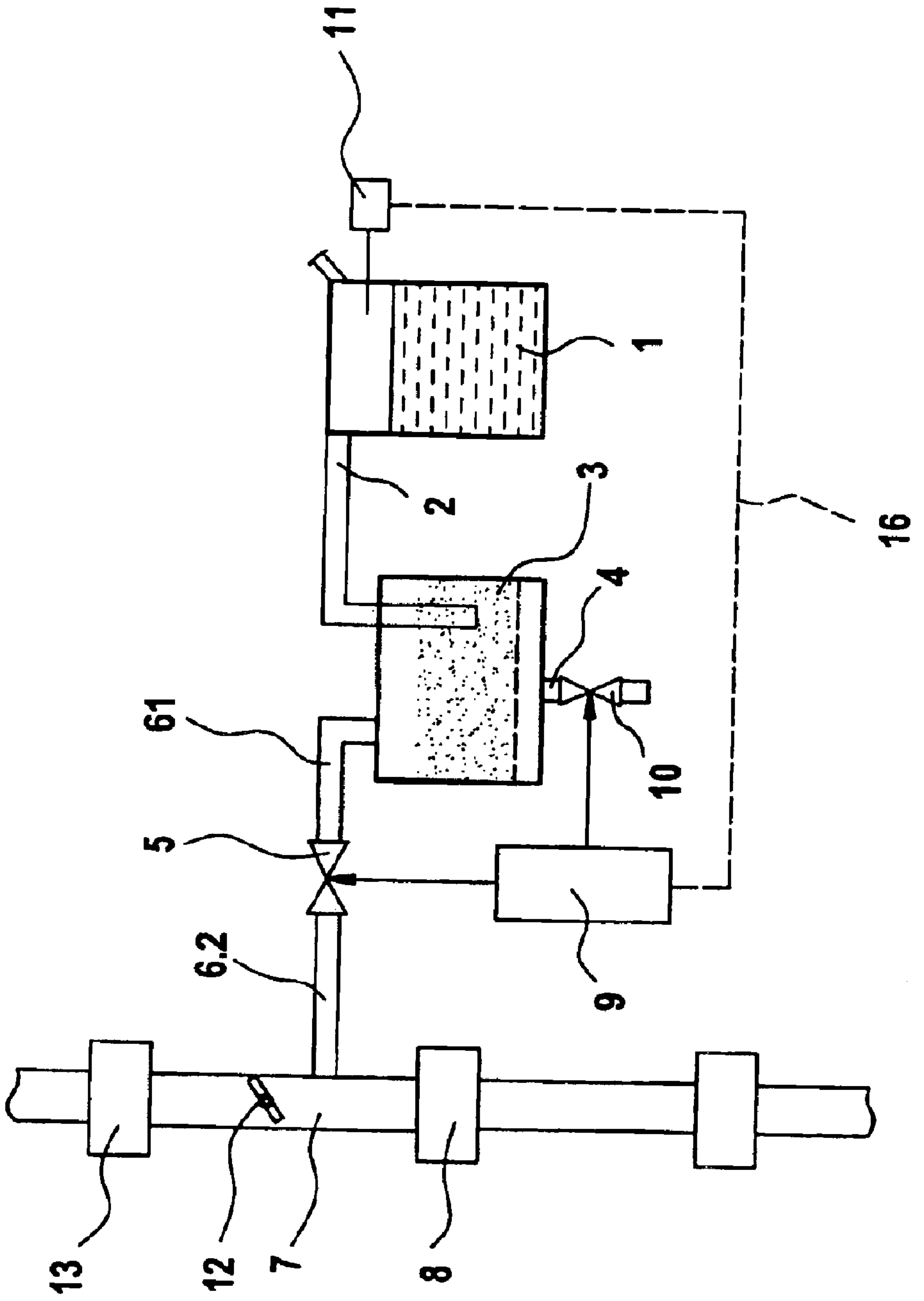
11
1
2
3
16
4
10
61
5
6.2
9
13
12
7
8

METHOD FOR DIAGNOSIS OF TANK LEAKAGE

BACKGROUND OF THE INVENTION

The present invention relates to a method for diagnosis of tank leakage.

In the non-published German patent application 101 26 521, a method for diagnosis of tank leakage is proposed, in which an outgassing of fuel can be calculated from the parameters of a motor control unit. It is disadvantageous with this method that the outgassing is determined with the ambient pressure, and it is not taken into consideration that with the tank leakage diagnosis, a negative pressure prevails in the fuel tank. Since with a negative pressure, more fuel is outgassed than with ambient pressure, too small of an outgassing is determined. With the tank leakage diagnosis, the fuel tank is evacuated at a diagnostic pressure and subsequently, a pressure increase is measured. From the trend of the pressure increase over time, a leak is closed. Since the outgassing also affects a pressure increase, the measured total pressure increase must be corrected to the outgassing pressure increase. This outgassing, however, is determined to be too small, whereby too minimal of a correction of the pressure increase takes place, so that by means of status signals of a leak, false readings can occur by the tank leakage diagnosis.

A method for checking a fuel tank is known from DE 198 30 234 C2, in which the fuel tank is permanently placed under negative pressure and in which the outgassing of fuel is taken into consideration, such that the tank leakage diagnosis takes place after a time period in which the outgassing is assumed to be sealed off. In order to ensure that with the tank leakage diagnosis outgassing processes have still occurred, the fuel tank is brought to ambient pressure and checked if a pressure increase takes place. If a pressure increase is measured, outgassing has still occurred and the pressure increase measured after the tank diagnosis is deducted calculatively from a pressure increase measured with the tank diagnosis. It is disadvantageous that the outgassing is measured metrologically with ambient pressure or excess pressure, while the tank leak diagnosis works at negative pressure. Therefore, the outgassing with this method is determined in an unreliable manner, so that frequently false readings occur, in which the driver is formed of a non-existent leak in a system of the fuel tank through a control light in the cockpit.

SUMMARY OF THE INVENTION

In contrast, the method for diagnosis of tank leakage according to the present invention has the advantage that in a simple manner, the determination of outgassing of fuel is improved, in which the outgassing is determined during tank ventilation with a same diagnostic pressure that also exists during the diagnosis of the tank leakage. This is achieved by a check valve provided in a ventilation line of a storage unit, which adjusts the diagnostic pressure at least in the median during the tank ventilation in the fuel tank.

In this manner, it is possible to subtract the outgassing-pressure increase caused by the outgassing from the total pressure increase measured in the diagnosis of tank leakage in an approximately more correct amount and to determine the leak-pressure increase actually caused by the leak, so that fewer false readings occur. The high expense with which known devices are operated in order to take into consideration the inaccurately determined outgassing is eliminated.

It is particularly advantageous if the check valve is a magnetic valve, which cyclically opens and closes during the tank ventilation, since in this manner, a cost-effective pressure adjustment in the fuel tank is made possible.

It is also advantageous if the check valve is a throttleable control valve, which can be adjusted during the tank ventilation, since in this manner, a pressure in the fuel tank can be adjusted, which is almost identical to the diagnostic pressure.

It is also advantageous if a pressure sensor is provided in the fuel tank and a control apparatus controls the pressure in the fuel tank measured by the pressure sensor by controlling the check valve, since in the manner, the diagnostic pressure in the fuel tank can be very precisely adjusted.

In addition, it is advantageous if the pressure in the fuel tank is controlled by means of a two-point control between an upper threshold and a lower threshold, since in this manner, a cost-effective magnetic valve with a slow cycle can be used as the check valve.

It is advantageous to determine the outgassing by means of a mass balance on the storage unit, since in this manner, the parameter values in the motor control unit can be reconsidered and no further measuring devices are required on the internal combustion engine.

It is also advantageous to calculate the outgassing during the tank ventilation, since only then the outgassing can be calculated via the parameter valves provided in the motor control unit.

In addition, it is advantageous to additionally tie the calculation of the outgassing to the operating state of the combustion engine with reference to ancillary conditions, since this can further increase the reliability of the tank leakage diagnosis.

BRIEF DESCRIPTION OF THE DRAWING

FIG. 1 shows one embodiment of the invention in a simplified representation and will be explained in the following description.

DETAILED DESCRIPTION OF THE PREFERRED EMBODIMENTS

The drawing shows in a simplified manner an already known device for ventilation of a fuel tank 1 of an internal combustion engine 8.

A ventilation channel 2 of the fuel tank 1 is connected to a storage unit 3 that is filled with a storage medium, such as activated carbon, which absorbs the volatized fuel from the fuel tank 1 temporarily. Before the absorption capacity of the storage unit 3 is depleted, in a flushing phase, a so-called tank ventilation, a tank ventilation valve 5 is opened, so that by means of a negative pressure in an intake manifold of the combustion engine 8, air flows via a ventilation line 4 through the storage unit 3. The activated carbon delivers thereby the absorbed fuel to the air. The fuel-air mixture, comprising air and fuel delivered from the storage unit, moves via a first discharge line section 6.1 to the tank ventilation valve 5 and subsequently via a second discharge line section 6.2 in the intake manifold 7 of a combustion engine 8 and, thereby, the intake air is added in the intake manifold 7 downstream of a throttle valve 12.

Upstream of the throttle valve 12, an air mass gauge 13 is provided, which determines the mass flow of the intake air drawn in by the combustion engine. The volume flow of the fuel-air mixture added from the device into the intake manifold 7 is also designated as a flushing volume flow. A control apparatus 9 controls the amount of the fuel-air mixture added in the intake manifold 7 over an opening time of the tank ventilation valve 5. If the tank ventilation valve 5 closes after a sufficiently longer time, the storage unit 3 can again absorb volatized fuel from the fuel tank 1 for a specified time.

In the ventilation line 4 of the storage unit 3, a check valve 10 is arranged, which can sealingly close the ventilation line 4 against the surrounding environment. By closing the check valve 10, the fuel tank 1 can be evacuated during a tank leakage diagnosis operating at negative pressure by means of the negative pressure in the intake manifold 7 to a predetermined diagnostic pressure.

A method for tank leakage diagnosis, for example, is proposed in the unpublished German patent application 101 26 521, whereby the content of this German application is incorporated by reference into the present application.

With the tank leakage diagnosis, the tank ventilation valve 5 is opened in a known manner and by closing of the check valve 10, produces a negative pressure in the fuel tank 1, since the negative pressure in the intake manifold 7 starting from the intake manifold 7 reduces to a pressure loss until dispersing in the fuel tank 1. Subsequently, also the tank ventilation valve 5 is again closed, so that the entire device, starting from the fuel tank 1 via the ventilation channel 2, the storage unit 3, the first discharge line section 6.1 to the tank ventilation valve 5 now is sealingly closed against the surrounding environment. Now, the pressure increase in the device is measured by means of a pressure sensor 11 provided in the fuel tank 1. If the device is sealed, the pressure in the device remains constant or increases only slowly. A leak in the device is recognized, in that air from the environment flows through the leak into the device and a faster pressure increase takes place. If the pressure flow is measured over time, the increase of the pressure per unit time or an absolute predetermined pressure increase can be a gauge for a leakage in the device. The increase of the pressure per unit time is also designated as a negative pressure reduction gradient.

A pressure increase in the device, however, occurs also by means of an outgassing of fuel. The outgassing indicates the change of the aggregate state of the fuel from liquid to gas. A total pressure increase composes, therefore, a leak pressure increase, which is caused by a leak, and from an outgassing pressure increase as a result of outgassing. The outgassing pressure increase must be determined and subtracted from the total pressure increase, in order not to close a leak in an incorrect manner and produce false reports.

The outgassing of fuel is greatly pressure-dependent and is higher with lower pressure than with a high pressure. Thus, it is necessary to also include the pressure dependency of the outgassing with the determination of the outgassing of fuel.

The outgassing is determined in a known manner in a phase of the tank ventilation. The outgassing of fuel can be calculated as a mass flow via a mass balance on the storage unit 3. The fuel mass stored in the storage unit 3 provides the fuel mass supplied in a time period to the storage unit 3 via the ventilation channel 2 from the fuel tank 1 less the fuel mass carried away from the storage unit 3 via the first discharge line section 6.1 in the same time period. Through the mixture correction of the fuel-air mixture supplied to the combustion engine 8 by means of a lambda control, also a fuel mass is known, which arrives with the flushing volume flow of the tank ventilation into the intake manifold 7. The flushing volume flow of the tank ventilation is calculated from the product formed from the opening time of the tank ventilation valve 5 and the volume flow known from a valve characteristic line of the tank ventilation valve 5 with a known pressure difference between the intake manifold 7 and the storage unit 3. From this, the outgassing of fuel as a fuel mass flow of the tank ventilation is determined.

With the method of the present invention for tank leakage diagnosis, the tank ventilation valve 5 is opened during the tank ventilation and the check valve 10 is controlled in its position by the control apparatus 9, such that the predetermined diagnostic pressure of the tank leakage diagnosis in the fuel tank 1 is adjusted at least to the median.

The check valve 10 is a magnetic valve, for example, which is opened intermittently by the control apparatus 9 and is closed, so that it adjusts the diagnostic pressure of the tank leakage diagnosis in the fuel tank 1 to the median. The check valve 10, however, can also be a throttleable control valve, which can be sealingly closed, whose throttle cross section can be adjusted and is continually controlled by means of the control. While the cyclically controlled magnetic valve only has the "opened" or "closed" state, the throttleable control valve has many further intermediate positions between the opened and closed states, which, respectively, permits a different volume flow through the control valve.

The pressure in the fuel tank 1 is measured by means of a pressure sensor 11. The pressure measured by the pressure sensor 11 is forwarded with a control line 16 to the control apparatus 9 as an electric control variable, which regulates the check valve 10 by means of a control.

If the pressure in the fuel tank 1 increases from a negative pressure as the diagnostic pressure to the diagnostic pressure of the tank leakage diagnosis, the check valve 10 is closed. Now, no fresh air can be drawn in any longer via the ventilation line 4 and the check valve 10. Instead, the fuel-air mixture is drawn out from the fuel tank 1 with an opened tank ventilation valve 5, so that the pressure in the fuel tank 1 again decreases.

If the pressure in the fuel tank 1 lowers from a higher pressure as the diagnostic pressure to the diagnostic pressure of the tank leakage diagnosis, the check valve 10 is opened. Now, fresh air can be drawn in via the ventilation line 4 and the check valve 10, which partially flows via the ventilation channel 2 into the fuel tank 1, so that the pressure in the fuel tank 1 again increases. In this manner, a balance between the drawn-out fuel-air mixture and drawn-in fresh air is formed. The pressure in the fuel tank 1 is regulated to the diagnostic pressure.

For this control, a throttleable control valve with a sufficiently fast control can be used as the check valve 10 or a magnetic valve can be used, which permits a fast cycling for adjustment of a minimal volume flow of drawn-out fuel-air mixture and from the flowing-in fresh air. If such a magnetic valve is not available, the pressure in the fuel tank 1 can be controlled also by means of a check valve 10 with a slower control, for example, a two-point control. In this manner, the pressure in the fuel tank 1 is regulated between an upper threshold pressure and a lower threshold pressure. The diagnostic pressure of the tank leakage diagnosis lies between the upper threshold pressure and the lower threshold pressure.

If the pressure in the fuel tank 1 reaches the upper threshold pressure from a negative or low pressure than the upper threshold pressure, the check valve 10 is closed and the pressure in the fuel tank 1 again decreases with an opened tank ventilation valve 5.

If the pressure in the fuel tank 1 reaches the lower threshold pressure from a higher pressure than the lower threshold pressure, the check valve 10 opens and the pressure in the fuel tank 1 again increases. In this manner, the pressure in the fuel tank 1 vacillates between the upper threshold pressure and the lower threshold pressure. The diagnostic pressure in the fuel tank 1 is placed in the middle, or median, which also exists with the tank leakage diagnosis in the fuel tank 1. In this regard, the adjusted pressure vacillation corresponds approximately to the pressure flow, which adjusts also with the tank leakage diagnosis with an overexpansion of the fuel tank 1 with subsequent tension release.

While the pressure in the fuel tank 1 is regulated during the tank ventilation in this manner to the diagnostic pressure, the outgassing is calculated and determined in an ongoing basis over a predetermined time period from the mass balance.

Since this outgassing is determined at least at the median of the diagnostic pressure, the calculated outgassing is approximately identical with the actual outgassing during the tank leakage diagnostic. The calculated outgassing is converted into a pressure increase. The calculation of the outgassing can take place before or after the tank leakage diagnosis. The calculated outgassing pressure increase is subtracted from the total pressure increase measured in the tank leakage diagnosis. In this manner, one obtains the leakage pressure increase, which would be caused actually by a possible leak.

If the leakage pressure increase in the fuel tank 1 exceeds a predetermined value, the driver is notified of a leak in the system of the fuel tank by means of a control light in the cockpit of the motor vehicle. False reports, which display a leak that does not actually exists, must be avoided, of course.

The tank ventilation with simultaneous calculation of the outgassing can take place continuously with operation of the combustion engine. For this reason, it is taken into consideration that the outgassing of the fuel changes during the operation of the combustion engine. Additionally, further auxiliary conditions for the calculation of the outgassing can be compiled, for example, that the calculation only takes place with idling of the combustion engine and/or only with quasi-stationary driving or with other operating conditions. Based on these auxiliary conditions, the calculation of the outgassing can be further improved.

It will be understood that each of the elements described above, or two or more together, may also find a useful application in other types of constructions differing from the types described above.

While the invention has been illustrated and described herein as a method for diagnosing tank leakage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for diagnosis of tank leakage in a tank ventilation device made up of a fuel tank, which is directly connected with an intake manifold of an internal combustion engine by means of at least one storage unit and a tank ventilation valve, wherein the at least one storage unit has a ventilation line with a check valve and during a tank ventilation, provides outgassed fuel from the fuel tank via the tank ventilation valve into the intake manifold, and wherein the tank ventilation device is checked during a diagnosis for tank leakage for leaks, wherein during the tank ventilation, a pressure in the fuel tank (1) is adjusted by means of the check valve (10), which at least at a median, is commensurate with a predetermined diagnosis pressure in the fuel tank (1) during the diagnosis for tank leakage.

2. The method according to claim 1, wherein the check valve (10) is a magnetic valve, which is cyclically opened and closed during the tank ventilation.

3. The method according to claim 1, wherein the check valve (10) is a throttleable control valve that is continually adjusted during the tank ventilation.

4. The method according to claim 2, wherein the pressure in the fuel tank (1) is controlled by means of control apparatus (9) controlling the check valve (10), wherein the control apparatus (9) conveys the pressure in the fuel tank (1) measured by a pressure sensor (11) as a control variable via a control line (16).

5. The method according to claim 4, wherein the pressure in the fuel tank (10) is controlled by means of a two-point control between an upper threshold pressure and a lower threshold pressure.

6. The method according to claim 1, wherein the diagnosis of tank leakage is performed by means of a negative pressure in the fuel tank (1).

7. The method according to claim 1, wherein the mass of the fuel outgassed from the fuel tank (1) is calculated by means of a mass balance.

8. The method according to claim 1, wherein a calculation of a mass of the fuel outgassed from the fuel tank (1) takes place during the tank ventilation.

9. The method according to claim 8, wherein the calculation of the mass of the fuel outgassed from the fuel tank (1) takes place only during predetermined operating conditions.

10. The method according to claim 1, wherein an outgas pressure increase in the fuel tank (1) affecting the outgassed fuel is calculated and the total pressure increase determined with the diagnosis of tank leakage is corrected to the outgas pressure increase.

* * * * *